United States Patent [19]
Granger

[11] 3,744,226
[45] July 10, 1973

[54] TREE FRUIT PICKING APPARATUS

[76] Inventor: Charles C. Granger, 1203 Chestnut St., Henderson, N.C. 27536

[22] Filed: Apr. 11, 1972

[21] Appl. No.: 242,973

[52] U.S. Cl.............................................. 56/328 R
[51] Int. Cl.............................................. A01g 19/00
[58] Field of Search................. 56/328 R, 330, 126, 56/130, 48

[56] References Cited
UNITED STATES PATENTS

| | | | |
|---|---|---|---|
| 3,541,772 | 11/1970 | Miller | 56/328 R |
| 3,427,796 | 2/1969 | McCray et al. | 56/328 R |
| 3,413,789 | 12/1968 | Studer | 56/330 |
| 3,494,117 | 2/1970 | Weygandt et al. | 56/330 |
| 3,653,195 | 4/1972 | Cochran | 56/328 R |
| 3,552,107 | 1/1971 | Swift | 56/328 R |

*Primary Examiner*—Antonio F. Guida
*Attorney*—Harvey B. Jacobson

[57] ABSTRACT

A tree fruit picking apparatus comprising a plurality of rigid support rods affixed to a rotatably driven support frame and diverging outwardly therefrom, each rod carrying several fruit-grasping members each of which defines a fruit-receiving opening to retentively grasp the fruit in its path and free such from its stem. A stationary shield partially surrounds the rotatable support member and is effective to orient the tree branches and also periodically depress the fruit-grasping members and subsequently release them, such that they spring outwardly into the tree branches to grasp the fruits in their paths.

20 Claims, 7 Drawing Figures

TREE FRUIT PICKING APPARATUS

The present invention is generally related to harvesting equipment and, more particularly, to tree fruit picking devices.

In the past, many harvesting machines have been proposed for picking or removing fruits, such as oranges, from the associated tree branches. Such conventional devices, however, have met with only marginal acceptance since they do not effectively orient the tree branches in a manner which exposes the fruit for mechanical picking. Furthermore, such devices have not provided a satisfactory manner of physically freeing each fruit from its stem. The use of conventional fruit picking devices often resulted in either leaving the fruit intact on the tree or excessively damaging the fruit as it was removed.

Therefore, it is an object of the present invention to provide a novel tree fruit picking apparatus which includes means for effectively orienting the tree branches during picking and fruit-grasping members which effectively pull the fruits from their stems with a minimum amount of damage or bruising.

Another object of the present invention is to provide a unique tree fruit picking apparatus which includes a rotatably driven support frame which carries a plurality of fruit-grasping members and which is partially surrounded by a shield with orientation prongs extending outwardly therefrom for engagement with the tree branches to lift, separate, or otherwise orient the branches to expose the fruit for picking.

It is a further object of the present invention to provide a versatile tree fruit picking apparatus with a plurality of wicket-like fruit grasping members which travel in circular paths and are shaped to provide tapered openings which capture each fruit and pull it from its stem.

Still another object of the present invention is to provide a novel fruit picking apparatus with fruit-grasping members which are periodically depressed as they pass through passageways associated with a stationary shield and are subsequently released to spring outwardly into the tree branches, whereby the effective fruit-receiving area is rapidly increased to snatch the fruits from the branches.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
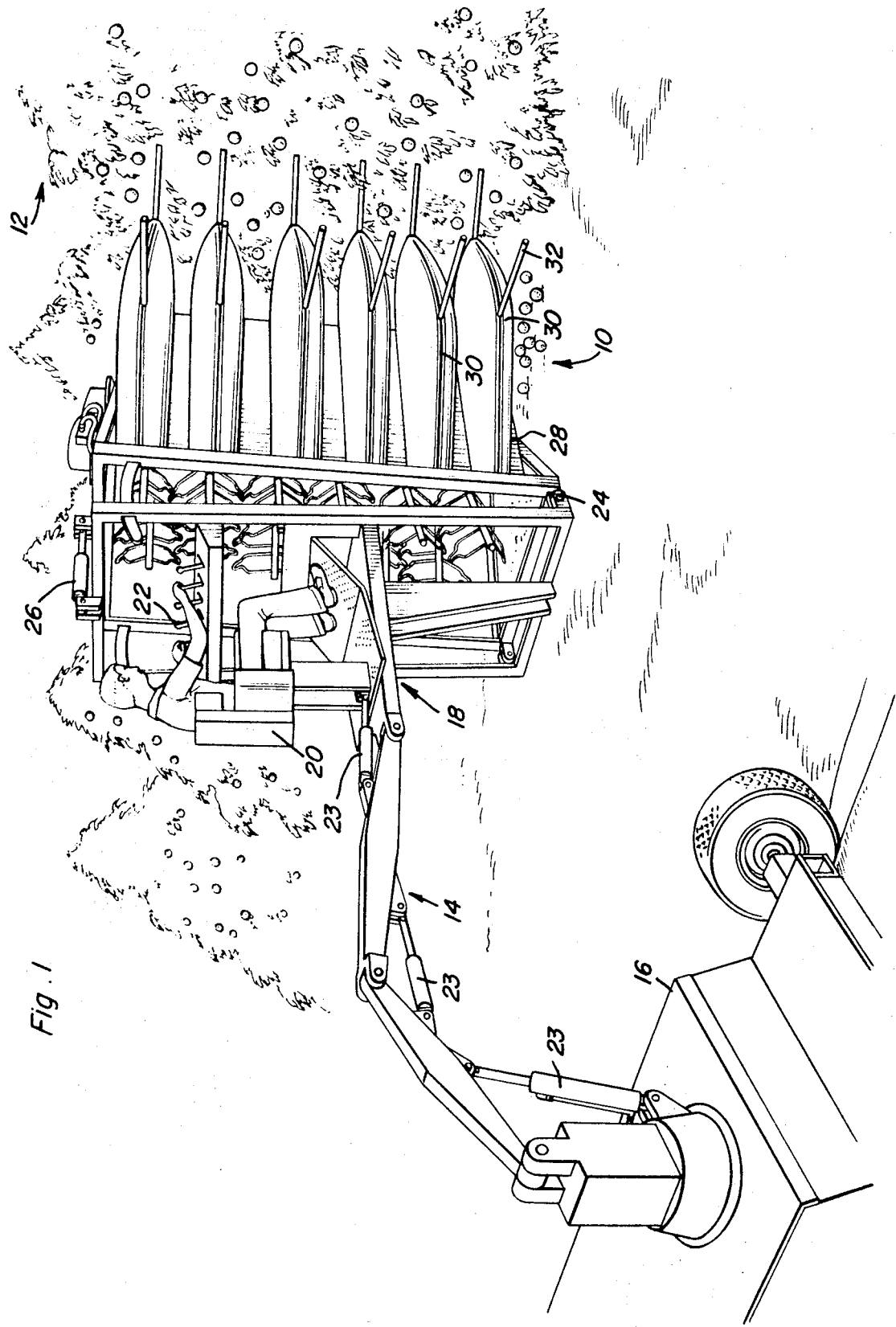
FIG. 1 is a perspective view of the tree fruit picking apparatus of the present invention is working engagement with the branches of a typical fruit tree.
Figure 2:
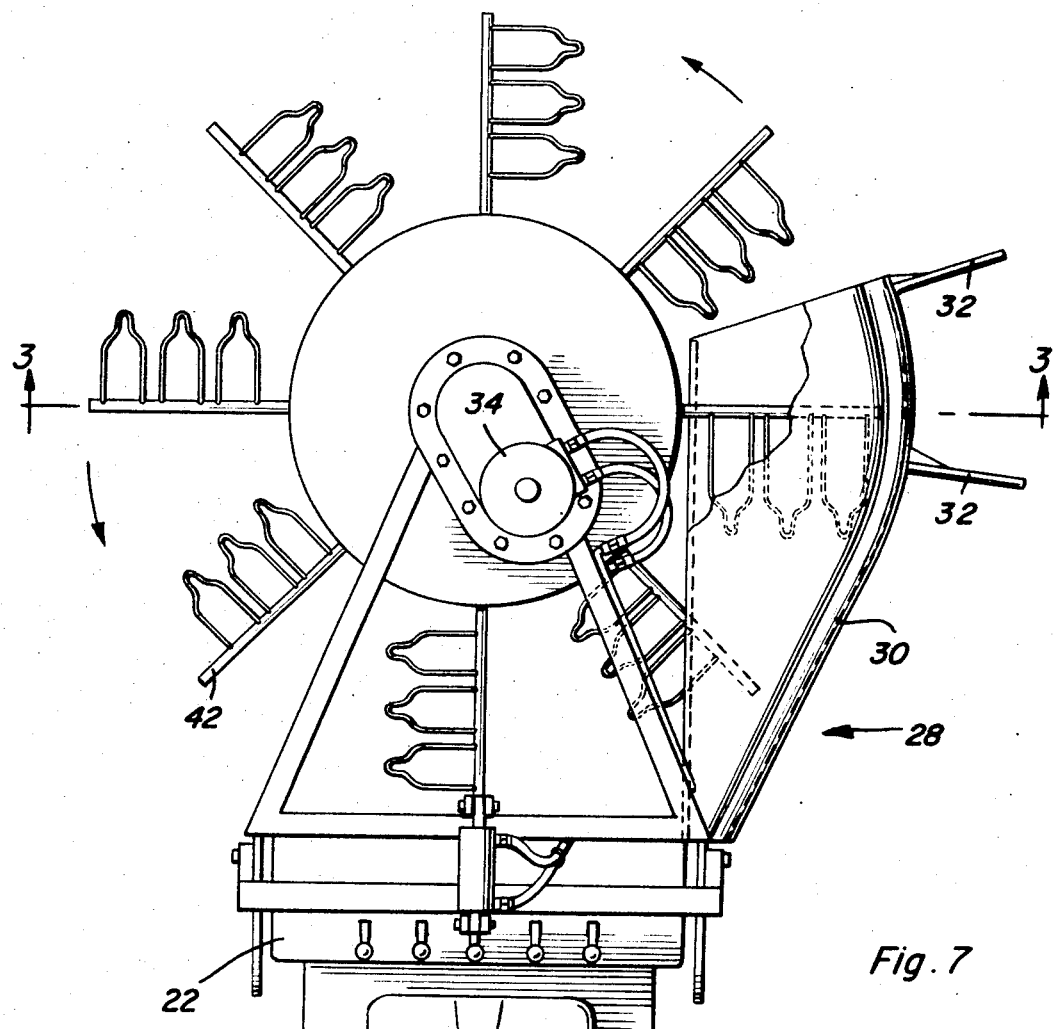
FIG. 2 is a plan view of the fruit picking apparatus illustrated in FIG. 1.

Referring now, more particularly, to FIGS. 1 and 2 of the drawings, the tree fruit picking apparatus of the present invention is generally indicated by the numeral 10 and is illustrated in FIG. 1 as being in working engagement with the branches of a typical fruit tree 12. The apparatus is movably supported by way of a superstructure 14 mounted to a vehicle 16 adapted to be driven through the orchard. It is not intended that the superstructure or vehicle form a part of the present invention, many conventional superstructures and vehicles being adaptable to support the fruit picking apparatus in a manner similar to that illustrated in FIG. 1.

Preferably, the outer end of the support structure is provided with an operator's station 18 with seat 20 and a control station 22. Several of the controls may be of the conventional hydraulic type which are connected to hydraulic cylinders 23 such that the orientation of the superstructure and the fruit picking apparatus may be adjusted by the operator. Vertical and horizontal movements of the apparatus may be effected through the corresponding movements of the superstructure with the inclination angle being adjustable by way of a pivotal mounting indicated at 24 and hydraulic cylinder 26, interconnecting the superstructure with the fruit picking apparatus.

The apparatus is provided with a relatively rigid, curved shield 28 formed from sheet metal or similar materials and partially surrounding the apparatus in order to bring the apparatus into working engagement with the tree branches, as illustrated in FIG. 1. The shield member is comprised of a plurality of vertically spaced, curved protrusions 30 which are hollow and define open passageways, as hereinafter explained. The exterior of each protrusion is provided with a pair of btanch-engaging prongs 32 which extend outwardly from the apparatus into working engagement with the tree branches. During operation of the fruit picking apparatus, the controls are adjusted to maneuver the shield and associated prongs into the fruit-bearing branches of the tree being picked, such that the branches are lifted, or otherwise oriented, to expose or position the fruit for picking, as hereinafter explained. Preferably, this operation is achieved by moving the apparatus from left to right as it is illustrated in FIG. 1 until the prongs are positioned under adjacent tree branches, then tilting the apparatus in a backward direction to lift the branches, whereby the fruit carried by each branch is oriented or positioned adjacent to the corresponding shield protrusion.

Figure 3:
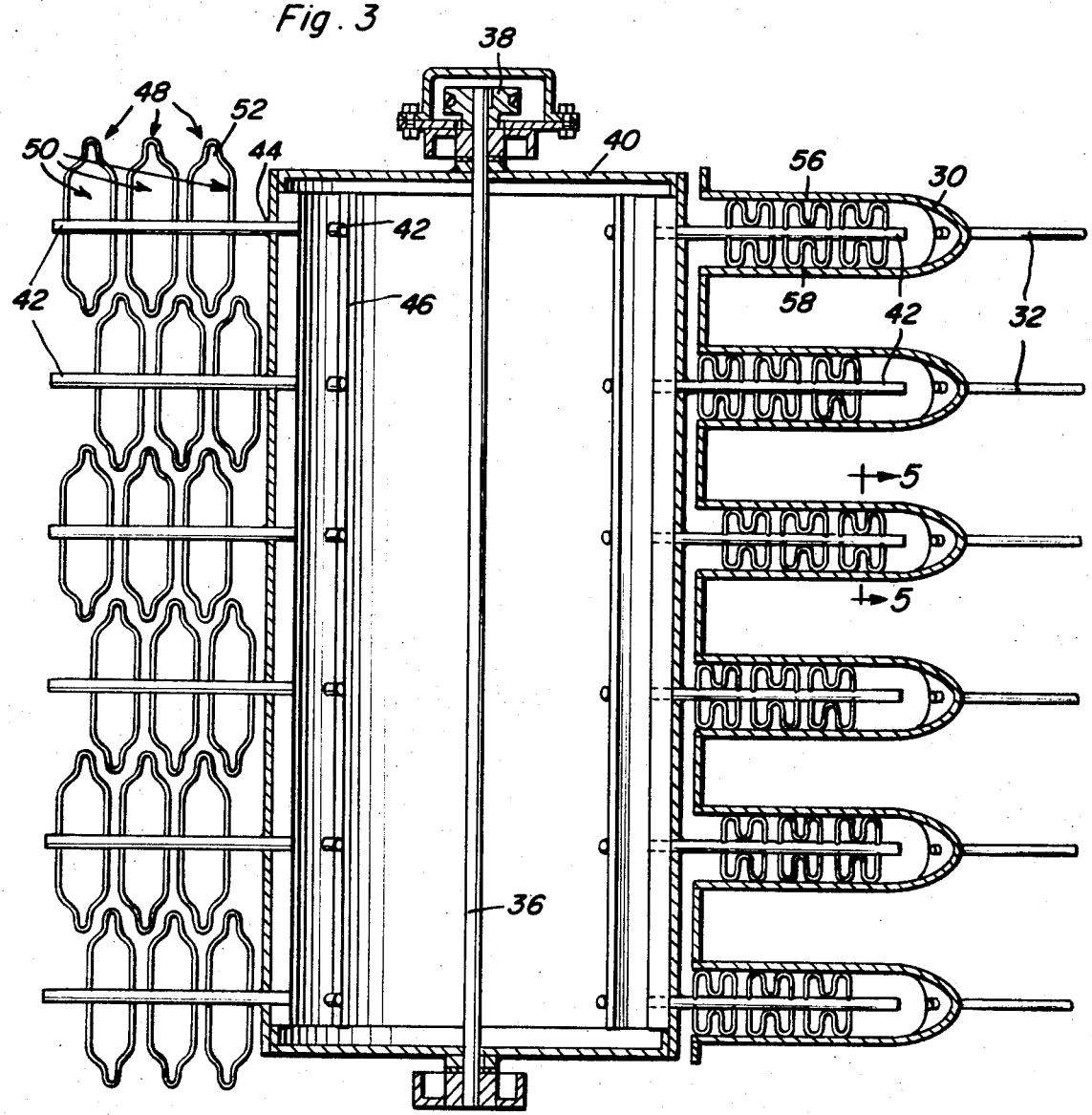
FIG. 3 is a sectional view taken along section 3—3 of FIG. 2.

With reference to FIGS. 2 and 3, it will be observed that the apparatus is provided with a hydraulic motor 34, or similar means, which is drivingly connected to a drive shaft 36 by way of a belt-and-pulley arrangement, such as that indicated at 38. A generally cylindrical support frame 40 is affixed to drive shaft 36 for rotation therewith. A plurality of rigid support rods 42 are affixed to support frame 40 and diverge outwardly therefrom in substantially radial directions. Each rod is firmly secured to the support frame by way of conventional means such as welding as indicated at 44. If desired, the support frame may be provided with elongated reinforcing members 46 which extend vertically on the interior of the support frame and snugly engage the end portions of the support rods to reinforce such to withstand the transverse forces encountered when picking the fruit from the tree branches. Preferably, the support rods are arranged in groups, each group lying along the same path of circular travel about the rotational axis of support frame 40. Each group of support rods is vertically spaced from the adjacent groups and is aligned with one of the passageways provided by the shield protrusions 30.

Each support rod carries a plurality of fruit-grasping members 48 which define fruit-receiving openings 50 which are of sufficient size to permit the passage of a fruit of the type being picked. The opening of each fruit-grasping member tapers inwardly as the member extends away from the associated support rod, wherein the opening is significantly reduced to a dimension smaller than the fruit being picked, as indicated at 52.

Figure 4:
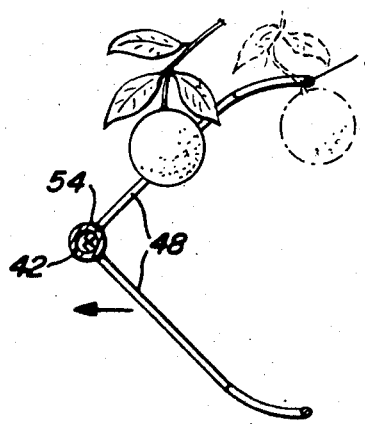
FIG. 4 is an elevational view of a pair of fruit-grasping members, one of which is illustrated in picking engagement with a typical fruit.

The basic operation of the apparatus may be briefly explained as follows. As the apparatus is moved into engagement with the fruit-bearing branches of the tree being picked, support frame 40 is rotated, thereby causing a circular, sweeping movement of the fruit-grasping members through the tree branches. Any fruits aligning with the fruit-grasping members as they are advanced, are captured in a manner illustrated in FIG. 4. Continued movement of each fruit-grasping member results in the fruit stem being embraced by the tapered portion 52, such that the fruit itself is captured and pulled free of the stem and falls to the ground or into a suitable catcher for subsequent collection and sorting. It will be appreciated that each fruit-grasping member is formed from a relatively thin, elongated wicket-like member which is fastened at opposite ends thereof to the associated support rod by way of a weld as indicated at 50, or similar means. In addition, each fruit-grasping member is made of resilient, yieldable materials which flex somewhat when exerting forces on the fruit stems. The relative thinness of the fruit-grasping members, together with their resiliency, significantly minimizes the amount of injury or damage to the fruit as it is freed from its stem.

Figure 5:
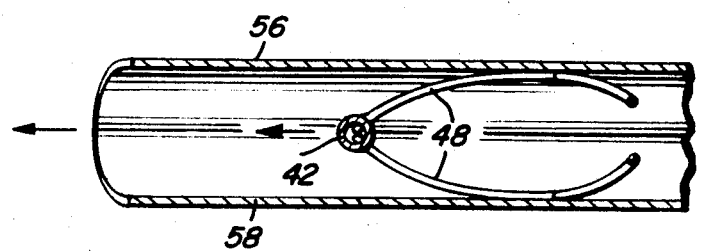
FIG. 5 is a sectional view taken along section 5—5 of FIG. 3.

As the support frame is rotated, the fruit-grasping members periodically pass through the aligned passageways defined by shield protrusions 30. With reference to FIGS. 3 and 5, it will be observed that the upper and lower walls 56 and 58, of each passageway are spaced from each other by a dimension significantly less than the spacing between the end portions of the oppositely disposed fruit-grasping members when in their normal fruit-engaging positions. As such, as the fruit-grasping members proceed through the associated passageways, they are flexed backwardly with respect to their directions of travel and depressed inwardly toward the associated support rod, such that the effective sweep area which they encompass is significantly reduced. The fruit-grasping members continue through the passageways in sliding engagement with walls 56 and 58. As each fruit-grasping member leaves the passageway, it is released such that it springs rapidly outward in a manner which tends to capture or snatch the fruit lying in its path.

It will be appreciated that the effective sweep area of the fruit-receiving openings is significantly increased as each fruit-grasping member leaves the associated passageway. This arrangement significantly increases the probability of capturing the fruit positioned near the passageway openings. This is due, in part, to the fact that orientation of the shield member in the branches tends to separate and position the branches such that much of the fruit will dangle near the passageway openings.

Figure 6:
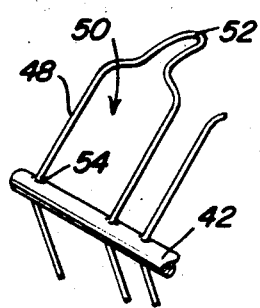
FIG. 6 is a perspective view of a fruit-grasping member associated with the present invention.

Referring now, more particularly, to FIG. 6, the construction of the fruit-grasping members can be seen in more detail. Each member is of wicket-like construction and extends away from the associated support rod in a direction opposite the direction of travel. This orientation provides smooth engagement between the wicket members and the passageway side walls as the wicket members are periodically flexed toward their depressed positions as they enter the passageways. It should be noted, however, that it is not intended that the fruit-grasping members of the present invention be limited to the configuration for mounting illustrated in the drawings. If desired, these members may be pivotally connected, or otherwise mounted to the associated support rod in a manner which permits flexing at the connection. In addition, the configuration of the wicket members may be modified somewhat, so long as the tapered configuration is maintained.

Figure 7:
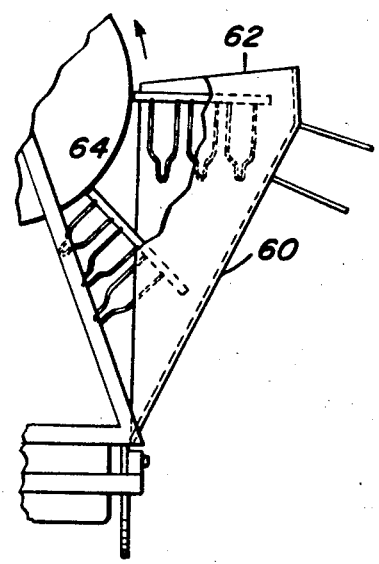
FIG. 7 is a partial elevational view of the fruit picking apparatus with an alternate form of the shield mounted thereto.

FIG. 7 illustrates a modified form of the shield member associated with the present invention. While the form illustrated in FIG. 1 is of gently curved configuration, the form shown in FIG. 7 is comprised of substantially flat side wall portions 60 which are welded or otherwise fastened in a conventional manner to the upper and lower wall portions 62 and 64, respectively. This type of construction produces substantially the same results as the preferred form illustrated in FIGS. 1 and 2. However, this type of construction may be preferred due to its simplicity and ease of manufacture.

From the foregoing description, it will be appreciated that the fruit-picking apparatus of the present invention may be conveniently oriented in the tree branches, with the shield member and associated prongs serving to maneuver and position the branches such that the fruit dangles adjacent to the associated passageway openings. In addition, the shield member is effective to periodically flex or depress the fruit-grasping members such that they spring outwardly, thereby increasing the probability of fruit capture for each revolution of the support frame. It will also be noted, that in the desired embodiment illustrated, the fruit-grasping members are positioned close to those of the adjacent support rods in a staggered fashion, such that together they define a relatively large sweep area which moves through the fruit-bearing branches of the tree. The spacing between the fruit-grasping members is sufficient to permit the passage of the branches, yet not large enough to permit passage of a fruit which is of sufficient size for picking.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. A fruit picking apparatus comprising a movable support frame adapted to be rotatably driven about an axis, at least one support element attached to said frame and extending outwardly from said axis whereby said element is driven in a generally circular path of travel, at least one fruit-grasping member attached to said support element for circular movement therewith, said fruit-grasping member being movable with respect to said element between a fruit-grasping position and a depressed position, the effective fruit-engaging area of said fruit-grasping member when in said fruit-grasping position being greater than when in said depressed position, and means associated with said support frame for periodically influencing said fruit-grasping member to said depressed position and subsequently releasing it to said fruit-grasping position whereby the effective sweep area of the fruit-grasping member through the foliage is periodically increased and decreased, said means for depressing said fruit-grasping member comprising a stationary shield partially surrounding said rotatable support frame and including passageway means through which said support element passes, said passageway means engaging said fruit-grasping member as it passes through said passageway means to maintain it in said depressed position.

2. The structure set forth in claim 1 wherein said fruit-grasping member is provided with a fruit receiving opening, the area of the projection of said opening in a plane perpendicular to the direction of travel being significantly greater when said fruit-grasping member is in said fruit-grasping position than when in said depressed position.

3. The structure set forth in claim 2 wherein said fruit-grasping member when in said depressed position extends outwardly from said support element and backwardly opposite to the direction of travel.

4. The structure set forth in claim 3 wherein said fruit-grasping member comprises a narrow closed wicket-like member with opposite ends thereof fastened to said support element.

5. The structure set forth in claim 4 wherein said fruit-grasping member is made of flexible, resilient material.

6. The structure set forth in claim 5 wherein said passageway means is defined by a pair of oppositely disposed walls generally parallel to said path of element travel, said element carrying a pair of said fruit-grasping members disposed on opposite sides of said element and simultaneously engaging said walls.

7. A tree fruit picking apparatus to be moved through the tree branches to free the encountered fruits from their stems, said apparatus comprising a rotatably driven support member for rotation about an axis, a plurality of elongated support elements attached to and extending outwardly from said support member for rotation therewith in circular paths, said support elements being axially spaced from each other along said axis, at least one fruit-grasping member carried by each of said support elements, each defining a fruit-receiving opening adapted to capture fruit as the elements are rotated through the tree branches, the fruit-grasping members carried by axially adjacent support elements extending axially toward each other when in fruit-grasping positions, and means for periodically depressing each of said fruit-grasping members axially toward the associated support element to a depressed position and subsequently releasing each fruit-grasping member to said fruit-grasping position, whereby the effective sweep area of the fruit-grasping members through the foilage is periodically increased and decreased.

8. The structure set forth in claim 7 wherein each of said fruit-grasping members comprises an elongated wicket-like member secured at opposite ends thereof to the associated support element to define said fruit receiving opening.

9. The structure set forth in claim 8 wherein each of said wicket-like members is of tapered configuration such that said opening is narrower than the fruit to be picked at a point remote from the associated support element.

10. The structure set forth in claim 7 wherein said support member includes a generally cylindrical outer surface which easily brushes past the tree branches.

11. The structure set forth in claim 7 wherein said support elements are arranged in axially spaced groups, the elements of each group lying approximately in the same path of travel, the fruit-grasping members of each group generally extending toward those of the adjacent groups, thereby defining a relatively large fruit-receiving sweep area as the support member is rotated.

12. The structure set forth in claim 11 wherein said depression means includes a shield member partially surrounding said support member and adapted to be moved into the tree branches, said shield member being provided with a plurality of spaced passageways through which said support elements and fruit-grasping members pass during rotation of said support member.

13. The structure set forth in claim 12 wherein said shield member is provided with a plurality of outwardly extending branch-maneuvering prongs which may be selectively inserted into the tree to orient the branches for effective fruit picking.

14. The structure set forth in claim 1 wherein said apparatus includes biasing means associated with said fruit-grasping member for influencing it toward said fruit-grasping position.

15. The structure set forth in claim 14 wherein said biasing means is yieldable to permit movement of said fruit-grasping member to said depressed position when it engages said passageway means.

16. The structure set forth in claim 15 wherein said fruit-grasping member slidably engages said passageway means when it is in said depressed position.

17. The structure set forth in claim 7 wherein each of said fruit-grasping members is provided with a fruit receiving opening, the area of the projection of said opening in a plane perpendicular to the direction of travel being significantly greater when said fruit-grasping member is in said fruit-grasping position than when in said depressed position.

18. The structure set forth in claim 17 wherein each of said fruit-grasping members when in said depressed position extends outwardly from said support element and backwardly opposite to the direction of travel.

19. The structure set forth in claim 11 wherein said depression means comprises a stationary member defining a plurality of passageways aligned with the paths of support element travel, said fruit-grasping member being depressed by said stationary member as they pass through the associated passageways.

20. The structure set forth in claim 19 wherein each of said fruit-grasping members slidably engages the associated passageway when in said depressed position.

* * * * *